Nov. 20, 1956  E. S. HOLLISTER  2,771,022
OPERATING MECHANISM FOR AUTOMATIC ELECTRIC TOASTERS
Filed Oct. 5, 1951  2 Sheets-Sheet 1
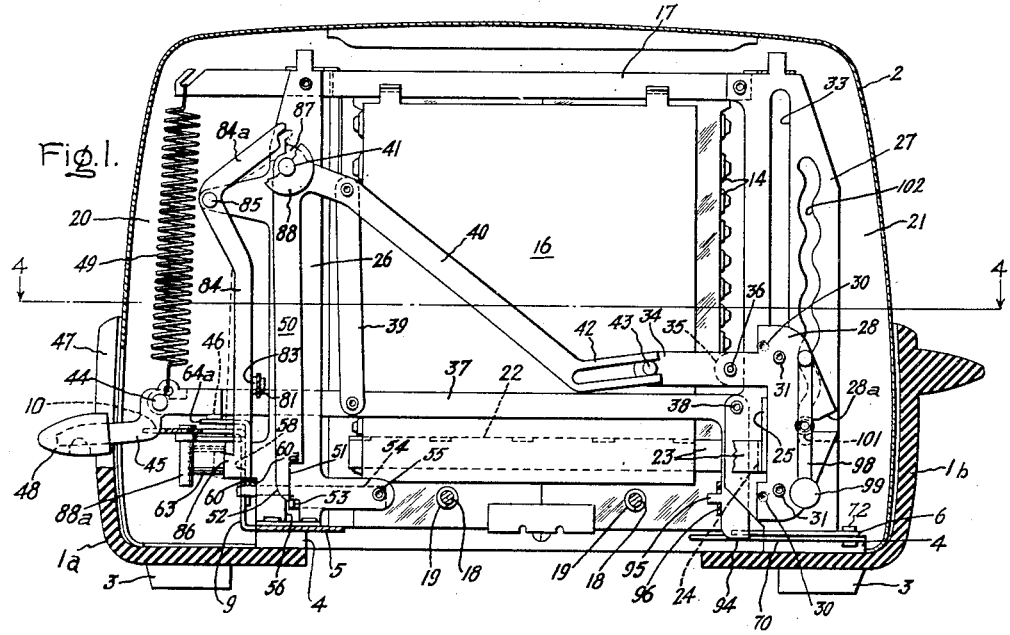
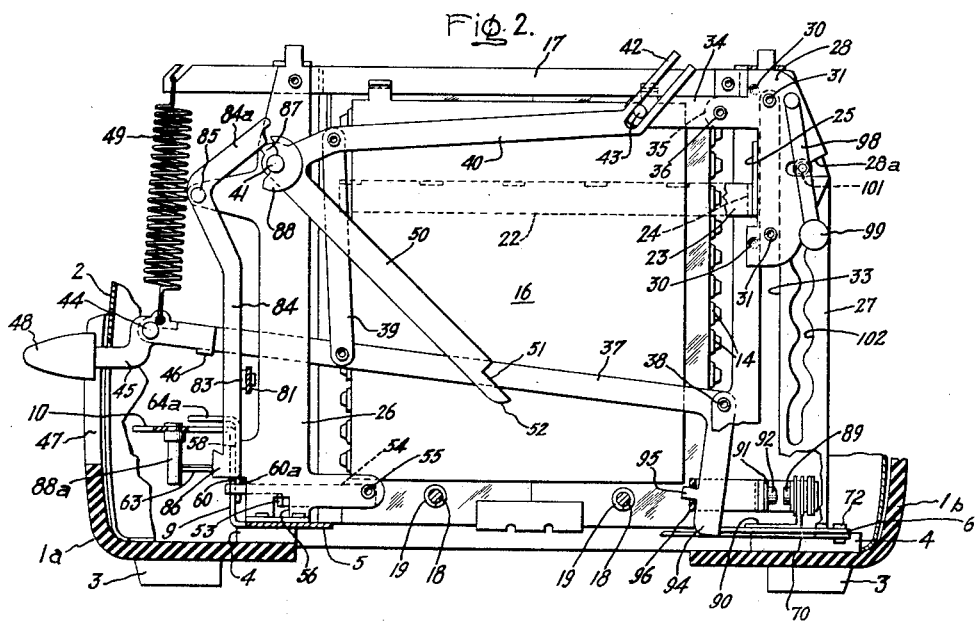
Inventor:
Edwin S. Hollister,
by William C. Edwards Jr.
His Attorney.

Nov. 20, 1956 E. S. HOLLISTER 2,771,022
OPERATING MECHANISM FOR AUTOMATIC ELECTRIC TOASTERS
Filed Oct. 5, 1951 2 Sheets-Sheet 2
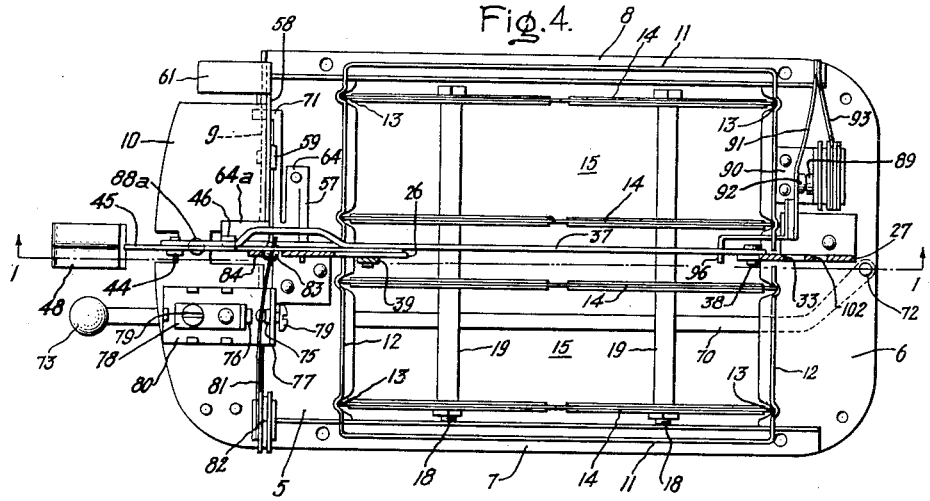
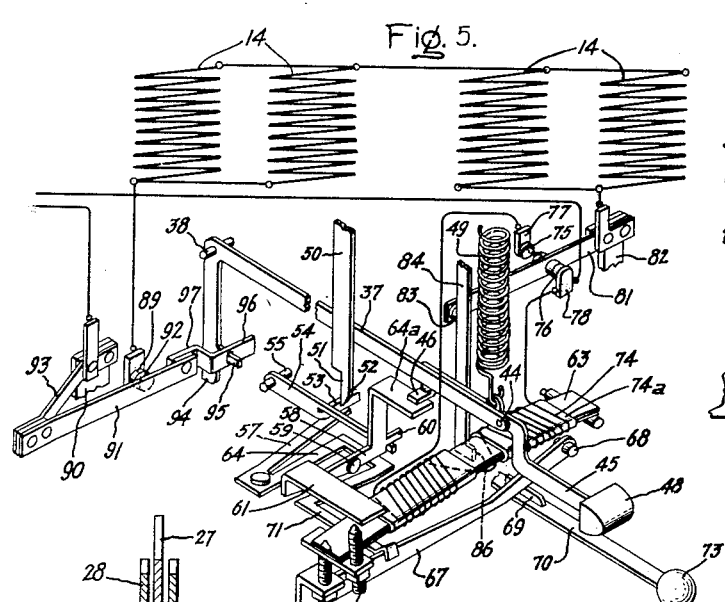
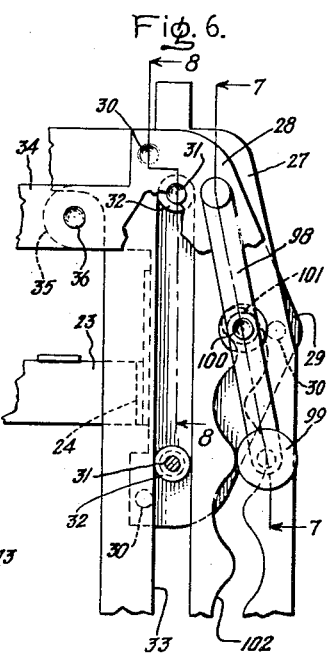
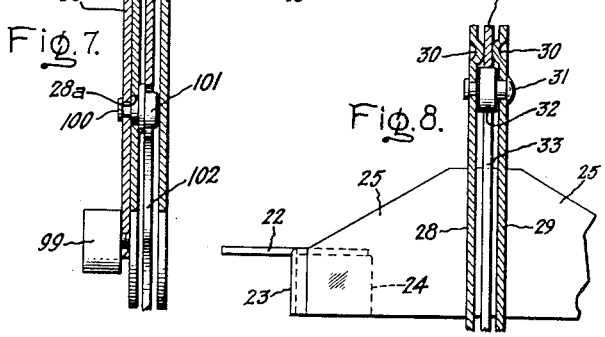
Inventor:
Edwin S. Hollister,
by *[signature]*
His Attorney.

United States Patent Office 2,771,022
Patented Nov. 20, 1956

2,771,022

OPERATING MECHANISM FOR AUTOMATIC ELECTRIC TOASTERS

Edwin S. Hollister, Allentown, Pa., assignor to General Electric Company, a corporation of New York Application October 5, 1951, Serial No. 249,962

13 Claims. (Cl. 99—329)

The present invention relates to automatic toasters of the type having a toaster rack or racks attached to the toaster carriage, the racks and carriage being biased by a spring or other suitable means to their upper non-toasting position, the racks and carriage being lowered to toasting position against the action of the biasing means, held in lowered position until the completion of the toasting operation and then released and permitted to be moved back to non-toasting position by the biasing means.

An object of the invention is to provide an improved actuating mechanism for effecting the movements of the toaster rack or racks and carriage which is simple in structure and reliable in operation and which comprises a minimum number of moving parts.

A further object is to provide a timer mechanism of the heat up-cool down type having an improved and simplified arrangement of parts including an improved and simplified arrangement of the heat responsive bimetallic element.

According to one feature of the invention, the heat responsive bimetallic element is pivoted at one end, flexes at its central portion to assume a bowed position during the heating up period, and is then held at its central portion during the cooling down period so that its free end moves to effect release of the toaster carriage for its return movement.

In the drawing Fig. 1 is a longitudinal sectional view taken on line 1—1, Fig. 4, the toaster racks and carriage being in lowered toasting position; Fig. 2 is a view similar to Fig. 1, the toaster carriage being in raised non-toasting position; Fig. 3 is an end view of a timer mechanism of the heat up-cool down type showing the arrangement of the heat-responsive bimetallic element; Fig. 4 is a transverse sectional view taken on line 4—4, Fig. 1; Fig. 5 is a detached perspective view of the moving parts of the toaster together with a wiring diagram; Fig. 6 is a side view on a scale larger than Figs. 1 and 2 of a mechanism for retarding or damping the upward movement of the toaster carriage; Fig. 7 is a detail sectional view taken on line 7—7, Fig. 6; and Fig. 8 is a detail sectional view taken on line 8—8, Fig. 6.

Referring to the drawing, the toaster casing comprises a front base section 1a, a rear base section 1b and a hood section 2 which fits between the base sections and is suitably attached thereto. Each base section is provided with supporting toes 3 at each of its two corners and with raised bosses 4. A rectangular metal base frame comprising front and rear end plates 5 and 6 and side angles 7 and 8 is mounted on the raised bosses 4. The bottom opening within the frame may be covered with a suitable crumb tray (not shown). Formed integral with front end plate 5 is a vertical wall 9, at the upper edge of which is a horizontally extending shelf 10. Supported on the metal frame and suitably attached thereto are relatively thin sheet metal walls which define the toasting chamber. In the present instance there is shown an arrangement comprising side walls 11, each provided with inturned flanges 12 which together form the end walls of the toasting chamber. Flanges 12 are spaced apart at their adjacent vertical edges (see Fig. 4) to provide passages for certain parts of the operating mechanism. Flanges 12 are shaped to define vertically extending grooves 13 in which are positioned the edges of electric heating units 14 which may be of a usual type comprising resistance ribbon wound on mica sheets. Four heating units are provided, the invention being shown as embodied in a toaster for toasting simultaneously two slices of bread, and each pair defines a toasting compartment 15 between them. The toaster compartments are separated from each other by a central sheet metal wall or baffle plate 16 carried by a central longitudinally extending cross bar 17. In Fig. 4, the baffle plate 16 has been omitted in order to show other of the parts more clearly. At their lower ends, heater elements 14 are fastened together and held spaced by rods 18 on which are spacing sleeves 19.

At the front and rear ends of the toaster between the end walls formed by flanges 12 and the casing are front and rear compartments 20 and 21, in which operating parts for the toaster are located. In each toasting compartment 15 is a bread rack 22 movable from a raised non-toasting position, as shown in Fig. 2, to a lowered toasting position, as shown in Fig. 1. The top wall of hood 2 is provided with an opening (not shown) in line with toasting compartments 15 through which slices of bread may be inserted into the toasting compartments to rest on the bread racks. The rear ends 23 of the webs of the bread racks project into compartment 21 and have flanges 24 (Fig. 8) which are fixed to wings 25 which form a part of a toaster carriage which is moved down and up and carries with it the bread racks.

The invention of this application has to do with the mechanism for lowering the bread rack or racks to toasting position, maintaining them there until the slice or slices of bread are toasted to the desired extent and then effecting automatically the raising of the bread rack or racks.

In compartment 20 at the front end of the toaster is a vertical post 26 which at its lower end is fixed to end plate 5 and at its upper end to cross bar 17, and in compartment 21 is a vertical post 27 which at its lower end is fixed to plate 6 and at its upper end to cross bar 17. Posts 26 and 27 are formed from flat metal stock and are positioned edgewise in longitudinal alignment. The two posts 26 and 27 connected at their upper ends by cross bar 17 form a rigid frame carried by the rectangular base plate.

Post 27 forms a guide for the toaster carriage. The toaster carriage comprises two flat plates 28 and 29 with which wings 25 are integral. Plates 28 and 29 are positioned on opposite sides of post 27 and are provided with struck out buttons 30 which slide on the surfaces of post 27. Plates 28 and 29 are fastened together by vertically spaced rivets 31 on which are guide rollers 32 which ride in a longitudinal slot 33 in post 27. Plate 28 is provided with an inwardly extending arm 34 and parallel to it but shorter is an inwardly extending arm 35 on plate 29. Arms 34 and 35 are fastened together by a spacing rivet 36. There is thus provided a rigid toaster carriage to which the toaster racks are connected and which is guided in its up and down movements on guide post 27.

The carriage is moved from its upper position, as shown in Fig. 2, to its lower position, as shown in Fig. 1, by a lever arm 37 which is pivoted on post 27 as indicated at 38 and is connected by a pivot link 39 to a lever arm 40. Lever arm 40 is pivoted at one end at 41 on post 26 and at its free end has an angularly extending furcation 42 which takes over a pin 43 at the end of arm 34. Pivoted at 44 on the free end of lever arm 37 is an offset lever 45 which at its inner end has a lug 46 which lies under lever arm 37. The outer end of lever 45 projects out through a vertical slot 47 in the toaster casing and is provided with a hand knob 48. Connected to lever 45 on the side of pivot 44 opposite knob 48 is one end of a tension spring 49, the other end of which is connected to cross bar 17. Spring 49 biases the toaster racks and carriage to the non-toasting position shown in Fig. 2. It also biases lever 45 to the position shown in Figs. 1 and 2 so that lug 46 is held against the underside of lever 37. The toaster racks and carriage are lowered by pressing down on knob 48. By reason of lug 46 engaging the underside of lever arm 37, lever arm 37 and offset lever 45 move as a unit against the action of biasing spring 49 and through pivot link 39 lower lever arm 40 which, through its connection with pin 43, lowers the carriage and toaster racks. The return movement of the carriage and racks is effected by biasing spring 49. The leverage arrangement is such that the relatively short movement of knob 48 is multiplied to effect the greater movement of the carriage and racks.

To hold the carriage and toaster racks in their lowered position against the biasing action of spring 49, there is provided integral with lever arm 40 a catch arm 50 which at its free lower end is provided with a catch finger 51 having a rounded forward surface 52. Catch finger 51 is adapted to engage an angularly extending lug 53 carried by a trip latch 54 which is pivoted at 55 on post 26, the post being provided with a rearwardly extending part at the outer end of which the pivot point for the latch lever is located. Trip latch 54 is positioned on the side of post 26 opposite that on which catch arm 50 is located and lug 53 extends through a notch 56 in post 26 to a position where it stands in the path of movement of finger 51. Trip latch 54 is biased to a position where lug 53 engages the top of notch 56 by a spring arm 57 of a compound leaf spring 64 (Fig. 5). When catch arm 50 moves downward, catch finger 51 rides over lug 53 pressing latch 54 downward against the biasing action of spring arm 57. As soon as catch finger 51 moves beyond the lug, the trip latch moves up again to bring lug 53 in front of finger 51 and thus hold the carriage and toaster racks in lowered position, as shown in Fig. 1. This is the position of the trip latch and catch finger shown in Fig. 5.

At the end of the toasting period, trip latch 54 is lowered to release lug 53 and permit the carriage and toaster racks to return to non-toasting position. This function is performed by a trip lever 58 which is pivoted at 59 on vertical wall 9 (see Figs. 3 and 5) and at one end has a nose 60, which projects through a notch 60a, Figs. 1 and 2, in post, 26 to a position where it stands over the free end of trip latch 54. At its other end, trip lever 58 has an offset arm 61 which is in line with the end of an adjustable screw 62 carried by the free end of a heat responsive bimetallic element 63. Trip lever 58 is biased to a position where nose 60 is out of engagement with the end of lever 54 and toward engagement with the top edge of notch 60a by the spring arm 57 of leaf spring 64. On trip lever 58 is a projection 64a which is directly beneath lug 46. The purpose of this is to permit manual movement of trip lever 58 by an upward movement of the outer end of lever 45 to move lug 53 and release catch arm 50.

Bimetallic element 63 functions as a timer for timing the duration of the toasting period. At its end opposite screw 62 it is pivoted on a bracket 65 fixed to the underside of shelf 10. As will be clear from Fig. 5, when its free end moves upward, screw 62 engages the underside of offset arm 61 to turn trip lever 58, thus forcing nose 60 down against the end of trip latch 54 and turning the latch to move lug 53 from engagement with finger 51. Normally the free end of bimetallic element 63 rests against an adjustable screw 66 at the free end of an arm 67 pivoted at 68 on wall 9. Arm 67 is biased downward into engagement with and is supported by a nose 69 on a lever 70 by a spring arm 71 which forms a part of leaf spring 64. Lever 70 is pivoted at 72 on the under surface of plate 6 and its other end projects to a point beyond the toaster casing where it is provided with an operating knob 73. The portion of the lower edge of arm 67, which is in engagement with nose 69, extends angularly with respect to the nose so that by turning lever 70 the free end of arm 67 may be adjusted to raise and lower screw 66. As shown in Fig. 5, the compound leaf spring 64 with its biasing arms 57 and 71 may be formed as an integral structure from a single piece of suitable spring material.

The bimetallic element is arranged with respect to the metals from which it is formed so that when heated its free end tends to flex downward so that when the free end is held from movement due to its resting on the top of screw 66 it bows upward.

The bimetallic element is heated by a winding 74 wound on two insulating sleeves 74a on the element, the sleeves being spaced apart to expose a portion of the bimetal at its center. The terminals of winding 74 are connected to two two-spaced stationary contacts 75 and 76 carried by brackets 77 and 78, each provided with a binding screw 79. Brackets 77 and 78 are mounted on and suitably insulated from shelf 10, as indicated at 80. Passing between contacts 75 and 76 is a resilient leaf spring switch blade 81 having contact buttons adapted to engage contacts 75 and 76. Switch blade 81 is biased toward contact 76 by its resiliency. At one end it is supported on and insulated from a bracket 82 fixed on shelf 10. Its other end is free and carries an insulating pad 83 which presses against the edge of a switch arm 84 pivoted at 85 on post 26. The lower end of switch arm 84 is provided with a hook 86 adapted to hook under the central portion of bimetallic element 63 and to which position it is biased by switch blade 81. At its upper end beyond pivot 85, switch arm 84 is provided with an extension 84a having a notched end adapted to rest normally against the high point of a cam 87 on lever arm 40 adjacent its pivot point 41, this being the position of the parts shown in Fig. 2. Extension 84a and cam 87 are kept in alignment by a large thin metal spring washer 88. On shelf 10 is a downwardly projecting pin 88a which serves as a guide for the free end of bimetallic member 63.

The main switch for the toaster (Figs. 2, 4 and 5) comprises a fixed contact 89 carried by and suitably insulated from a bracket 90 mounted on end plate 6 and a spring switch blade 91 having a contact 92 adapted to engage contact 89. Switch blade 91 is carried by the free end of a projecting spring arm 93 also supported by bracket 90 and insulated from it and from contact 89. Switch blade 91 is biased toward switch closed position by the spring arm 93 and the spring blade. It is normally held open by a downwardly projecting arm 94 on lever arm 37 provided with a projection 95 positioned in an opening in the offset end 96 of an arm 97 attached to but insulated from the free end of the switch blade. When lever 37 is lowered from the position shown in Fig. 2 to that shown in Fig. 1, arm 94 moves away from end 96 permitting the switch blade to close the contacts. When lever 37 moves up again, end 96 is turned in a direction to open the contacts.

When the carriage and toaster racks are released for movement from toasting to non-toasting position, spring 49 tends to return them with considerable speed and to overcome this there is provided a means for retarding or damping the return movement. For this purpose, there is provided on the carriage plate 28 a depending pivoted arm 98 having a weight 99 at its lower free end. At a point intermediate its ends, arm 98 is provided with a pin 100 provided with an enlarged end 101 which rides in a vertical undular slot 102 in post 27. Carriage plate 28 is provided with a clearance slot 28a for pin 100 to move in. Undular slot 102 is preferably sinusoidal.

With this arrangement, when the carriage moves up under the action of spring 49, the undular slot causes the pivoted arm 98 to swing on its pivot after the manner of a pendulum. This imparts to the weight a movement which has a back and forth component approximately transverse of the path of upward movement. This back and forth component requires successive acceleration and deceleration of the weight which takes place against the frictional drag of end 101 on the edges of slot 102, thus sobjecting the carriage to a retarding force which is approximately proportional to the velocity at which the carriage is moving up.

This damping arrangement is not claimed herein. It forms the subject matter of the application of Walter R. Weeks, Serial No. 249,979, filed October 5, 1951, and now Patent No. 2,653,533, assigned to the same assignee as the instant application.

The operation is as follows. Normally, when the toaster is not in operation, the various parts stand in the positions shown in Fig. 2. Bimetallic element 63 stands approximately horizontal as shown in dotted lines in Fig. 3, its free end resting on the upper end of adjusting screw 66. The hook 86 on the lower end of switch arm 84 presses against the side of the bimetallic element as shown in Fig. 2. It is biased toward it by the free end of switch blade 81. It is also held from movement by reason of its upper end 84a resting on the high point of cam 87. The main switch comprising switch blade 91 is held open by arm 94. Switch blade 81 is in contact with fixed contact 75 being held in engagement with it by switch arm 84. Lug 53 on trip latch 54 is held in engagement with the upper end of notch 56 by spring arm 57, which spring arm serves also to hold nose 60 on the end of trip lever 58 against the top of notch 60a.

When toast is to be made, the slices of bread are placed on the toast racks after which hand knob 48 is pressed downward to lower lever 37 and offset lever 45. As already pointed out, this serves to bring catch finger 51 into engagement with the lug 53 on trip latch 54, the toast racks and carriage being lowered through the leverage arrangement and tension spring 49 being placed under tension. At the same time, the lowering of lever arm 37 serves to permit switch blade 91 to bring contact 92 into engagement with fixed contact 89. The toast racks and carriage are now latched in toasting position and a circuit is closed through the heating units 14 and the winding on the bimetallic element 63. As will be clear from the wiring diagram, Fig. 5, the heating units and the winding on the bimetallic element are connected in series through contact 76. The units 14 are now heated to begin the toasting operation and, at the same time, the winding on the bimetallic element starts to heat the element tending to cause it to bow upward in the middle, its free end being held from movement by screw 66. When the bimetallic element reaches the position shown in Figs. 3 and 5, spring switch blade 81 moves switch arm 84 to a position where it brings hook 86 under the central portion of the bimetallic element, as shown in Figs. 3 and 5. This movement of switch arm 84 brings the notched end of extension 84a into engagement with the lower portion of cam 87, as shown in dotted lines in Fig. 1. When this takes place, the switch blade 81 moves out of engagement with contact button 75 and into engagement with contact button 76. This results in opening the circuit on the winding on the bimetallic element but still maintains circuit through the toaster units 14. The bimetallic element now starts to cool down. However, it is held from bowing back toward its initial position by the hook 86. As a result, the free end of the bimetallic element starts to move upwardly, and after moving a predetermined amount screw 62 carried by it engages the underside of offset arm 61, thus turning trip lever 58 and forcing nose 60 down against the free end of trip latch 54 to release catch arm 50 and permit biasing spring 49 to return the toast racks and carriage back to normal Fig. 2 positions. As lever arm 40 approaches the end of its movement, cam 87 rides under the end of extension 84a, turning switch arm 84 to move hook 86 out from under the bimetallic element 63 and serving to hold it in this position. Now as the toaster cools down, bimetallic element 63 cools and starts to move back toward its initial position.

The toaster may now be used to toast additional slices of bread. If sufficient time has elapsed for the toaster parts to reach normal temperature so that bimetallic element 63 is restored to its normal position, the lower dotted line position as shown in Fig. 3, then a second toasting operation will be timed the same as the first toasting operation. However, if the second toasting operation is started before bimetallic element 63 has cooled down to reach its normal position, then since at the beginning of the toasting operation it is already bowed to a certain extent, the toasting period will be shorter than the previous period. By this means, the toaster is made to compensate automatically for the residual heat in it at the beginning of any toasting operation.

The free end of bimetallic element 63 rests normally on the upper end of the adjusting screw 66 carried by arm 67. By moving adjusting lever 70, the arm 67 can be raised or lowered to raise or lower the free end of the thermostatic element. By this means, the toasting period can be shortened or lengthened so that by adjusting lever 70 the degree of toasting, i. e., the color of the toast, can be changed to suit the operator.

At any time when the toaster carriage is in lowered toasting position, it can be released by lifting up on offset lever 45. As will be clear from Fig. 1, when offset lever 45 is turned in a clockwise direction on its pivot, it presses down on projection 64a, thus turning trip lever 58 and trip latch 54 to release catch arm 50.

The adjustable screws 62 and 66 are set initially at the factory for the desired adjustment prior to the mechanism being assembled in the toaster.

What I claim as new and desire to secure by Letters Patent of the United States is:

1. In an automatic electric toaster having electric heating units, a carriage, means biasing the carriage to non-toasting position, means for moving the carriage from non-toasting to toasting position against the action of said biasing means and means for holding the carriage in toasting position, timing means for releasing said carriage holding means to permit the carriage to return to non-toasting position comprising a bimetallic element, means supporting the bimetallic element at one end about which it turns, the other end being free, a support for such free end, the bimetallic element being so arranged that when heated its free end tends to flex toward the support whereby the bimetallic element tends to bow in a direction away from such support, holding means positioned adjacent the central portion of said bimetallic element and operatively connected to said moving means which after the bimetallic element has bowed a certain amount engages it to hold it against return movement whereby upon cooling its free end flexes in a direction away from its support, heating means for the bimetallic element, means for controlling the energization and deenergization of said heating means, and means actuated by the free end of said bimetallic element when it flexes in a direction away from its support for actuating said carriage holding means to permit said biasing means to move said carriage to its non-toasting position, the latter movement being accompanied by release of said bimetallic element by said bimetallic element holding means.

2. In an automatic electric toaster having electric heating units, a carriage, means biasing the carriage to non-toasting position, means for moving the carriage from non-toasting to toasting position against the action of said biasing means and means for holding the carriage in toasting position, timing means for releasing said carriage holding means to permit the carriage to return to non-toasting position comprising a bimetallic element, means supporting the bimetallic element at one end about which it turns, the other end being free, a support for such free end, the bimetallic element being so arranged that when heated its free end tends to flex toward the support whereby the bimetallic element tends to bow in a direction away from such support, holding means positioned adjacent the central portion of said bimetallic element and operatively connected to said moving means which after the bimetallic element has bowed a certain amount engages it to hold it against return movement whereby upon cooling its free end flexes in a direction away from its support, heating means for the bimetallic element, a switch which closes a circuit through said heating means, means operated by the bowing of said bimetallic element to effect opening of said switch and the movement of said bimetallic element holding means into engagement with the bimetallic element, and means actuated by the free end of said bimetallic element when it flexes away from its support for actuating said carriage holding means to permit movement of the carriage from toasting to non-toasting position, the latter movement being accompanied by release of said bimetallic element by said bimetallic element holding means and the closing of said switch.

3. In an automatic electric toaster having electric heating units, a carriage, means biasing the carriage to non-toasting position, means for moving the carriage from non-toasting to toasting position against the action of said biasing means and means for holding the carriage in toasting position, timing means for releasing said holding means to permit the carriage to return to non-toasting position comprising a bimetallic element, means supporting the bimetallic element at one end about which it turns, the other end being free, a support for such free end, the bimetallic element being so arranged that when heated its free end tends to flex toward the support whereby the bimetallic element tends to bow in a direction away from such support, holding means positioned adjacent the central portion of said bimetallic element and operatively connected to said moving means which after the bimetallic element has bowed a certain amount engages it to hold it against return movement whereby upon cooling its free end flexes in a direction away from its support, heating means for the bimetallic element, a switch which closes a circuit through said heating means, means operated by the bowing of said bimetallic element to effect opening of said switch and the movement of said bimetallic element holding means into engagement with the bimetallic element, means actuated by the free end of said bimetallic element when it flexes away from its support for actuating said carriage holding means to permit movement of the carriage from toasting to non-toasting position, and means actuated by movement of the carriage from toasting to non-toasting position for moving said bimetallic element holding means from engagement with the bimetallic element.

4. In an automatic electric toaster having electric heating units, a carriage, means biasing the carriage to non-toasting position, means for moving the carriage from non-toasting to toasting position against the action of said biasing means and catch means for latching the carriage in toasting position, timing means for releasing said catch means to permit the carriage to return to non-toasting position comprising a bimetallic element pivoted at one end, a support for its other end, the bimetallic element being so arranged that when heated its free end tends to flex toward the support whereby the bimetallic element tends to bow in a direction away from such support, a switch arm operatively connected to said moving means and having a hook positioned adjacent the central portion of said bimetallic element, means biasing the switch arm toward the bimetallic element, the arrangement being such that after the bimetallic element has bowed a certain amount the hook engages it to hold it against return movement whereby upon cooling its free end flexes in a direction away from its support, a heating coil for the bimetallic element, a switch blade which when in a first position closes a circuit through the heating coil and the electric heating units and when in a second position closes a circuit through the electric heating units only, said switch blade moving from its first position to its second position when the switch arm moves to bring its hook under the bimetallic element, and means whereby when the free end of said bimetallic element flexes away from its support it releases said catch means to permit the carriage to return to non-toasting position, the return of said carriage being accompanied by movement of said hook out from under said bimetallic element and movement of said switch blade from its second position to its first position.

5. In an automatic electric toaster having electric heating units, a carriage, means biasing the carriage to non-toasting position, means for moving the carriage from non-toasting to toasting position against the action of said biasing means and catch means for latching the carriage in toasting position, timing means for releasing said catch means to permit the carriage to return to non-toasting position comprising a bimetallic element pivoted at one end, a support for its other end, the bimetallic element being so arranged that when heated its free end tends to flex toward the support whereby the bimetallic element tends to bow in a direction away from such support, a switch arm operatively connected to said moving means and having a hook positioned adjacent the central portion of said bimetallic element, means biasing the switch arm toward the bimetallic element, the arrangement being such that after the bimetallic element has bowed a certain amount the hook engages it to hold it against return movement whereby upon cooling its free end flexes in a direction away from its support, a heating coil for the bimetallic element, a switch blade which when in a first position closes a circuit through the heating coil and electric heating units and when in a second position closes a circuit through the electric heating units only, said switch blade moving from its first position to its second position when the switch arm moves to bring its hook under the bimetallic element, means whereby when the free end of said bimetallic element flexes away from its support it releases said catch means to permit the carriage to return to non-toasting position, and means actuated by return movement of said toaster carriage for moving said hook from engagement with said bimetallic element.

6. In an automatic electric toaster having electric heating units, a carriage, means biasing the carriage to non-toasting position, means for moving the carriage from non-toasting to toasting position against the action of said biasing means and catch means for latching the carriage in toasting position, timing means for releasing said catch means to permit the carriage to return to non-toasting position comprising a bimetallic element pivoted at one end, a support for its other end, the bimetallic element being so arranged that when heated its free end tends to flex toward the support whereby the bimetallic element tends to bow in a direction away from such support, a switch arm operatively connected to said moving means and having a hook positioned adjacent the central portion of said bimetallic element, means biasing the switch arm toward the bimetallic element, the arrangement being such that after the bimetallic element has bowed a certain amount the hook engages it to hold it against return movement whereby upon cooling its free end flexes in a direction away from its support, a heating coil for the bimetallic element, a switch blade which when in a first position closes a circuit through the heating coil and the electric heating units and when in a second position closes a circuit through the electric heating units only, said switch blade moving from its first position to its second position when the switch arm moves to bring its hook under the bimetallic element, means whereby when the free end of said bimetallic element flexes away from its support it releases said catch means to permit the carriage to return to non-toasting position, means actuated by the return movement of said carriage for moving said hook out from under said bimetallic element, the latter being accompanied by movement of said switch blade from its second position to its first position, and manually actuated means for adjusting said support to change the setting of said timing means.

7. In an automatic electric toaster having electric heating units, a carriage, means biasing the carriage to non-toasting position, means for moving the carriage from non-toasting to toasting position against the action of said biasing means and catch means for latching the carriage in toasting position, timing means for releasing said catch means to permit the carriage to return to non-toasting position comprising a bimetallic element pivoted at one end, a support for its other end, the bimetallic element being so arranged that when heated its free end tends to flex toward the support whereby the bimetallic element tends to bow in a direction away from such support, a switch arm operatively connected to said moving means and having a hook positioned adjacent the central portion of said bimetallic element, means biasing the switch arm toward the bimetallic element, the arrangement being such that after the bimetallic element has bowed a certain amount the hook engages it to hold it against return movement whereby upon cooling its free end flexes in a direction away from its support, a heating coil for the bimetallic element, a switch blade which when in a first position closes a circuit through the heating coil and the electric heating units and when in a second position closes a circuit through the electric heating units only, said switch blade moving from its first position to its second position when the switch arm moves to bring its hook under the bimetallic element, means whereby when the free end of said bimetallic element flexes away from its support it releases said catch means to permit the carriage to return to non-toasting position, and means actuated by return movement of said toaster carriage for moving said switch arm to disengage said hook from said bimetallic element and lock the switch arm in hook disengaged position.

8. A thermal timer for measuring a time interval comprising a bimetallic element pivoted at one end, a support for its other end, heating means for said bimetallic element, means controlling the energization and deenergization of said heating means, said element being so arranged that when heated its free end tends to flex toward said support, said support being rigidly mounted so as to resist movement of said free end toward said support so that said element bows in a direction away from the support, means for engaging said element after it is bowed and holding the element in its bowed position so that when it cools its free end flexes away from said support, and means responsive to the flexing of said free end away from its support to terminate the time interval.

9. A thermal timer for measuring a time interval comprising a bimetallic element pivoted at one end, a support for its other end, heating means for said bimetallic element, means controlling the energization and deenergization of said heating means, said element being so arranged that when heated its free end tends to flex toward said support, said support being rigidly mounted so as to resist movement of said free end toward said support so that said element bows in a direction away from the support, means for engaging said element after it is bowed and holding the bimetallic element in its bowed position so that when it cools its free end flexes away from said support, means responsive to the flexing of said free end away from its support to terminate the time interval, and manually operable means for adjusting the position of said support.

10. In an automatic electric toaster having a toaster carriage and catch means for holding the toaster carriage in toasting position, a timer of the heat up-cool down type for releasing said catch means comprising a bimetallic element pivoted at one end, a support for its other end, said element being so arranged that when heated its free end tends to flex toward said support, said support being rigidly mounted so as to resist movement of said free end toward said support so that it bows in a direction away from the support, means for holding the bimetallic element in its bowed position so that when it cools its free end flexes away from said support, heating means for said bimetallic element, means for controlling the energization and deenergization of said heating means, and means actuated by the flexing of such free end for releasing said catch means.

11. In an automatic electric toaster having a toaster carriage biased to non-toasting position and catch means for holding it in toasting position against the action of said biasing means, a timer of the heat up-cool down type for releasing said catch means comprising a bimetallic element pivoted at one end, a support for its other end, said element being so arranged that when heated its free end tends to flex toward said support, said support being rigidly mounted so as to resist movement of said free end toward said support so that it bows in a direction away from the support, hook means for holding the bimetallic element in its bowed position so that when it cools its free end flexes away from said support, heating means for said bimetallic element, means for controlling the energization and deenergization of said heating means, and means actuated by the flexing of such free end away from its support for releasing said catch means; and means actuated by movement of said toaster carriage from toasting position to non-toasting position for moving said hook means from engagement with said bimetallic element.

12. A thermal timer for measuring a time interval comprising a bimetallic element, means supporting the bimetallic element at one end about which it turns, the other end being free, a rigid support for such free end on which it rests, said element being so arranged that when heated its free end tends to flex toward the support so that it bows in a direction away from the support, heating means for said bimetallic element, means for controlling the energization and deenergization of said heating means, means for engaging said element after it is bowed and holding the bimetallic element in its bowed position so that when it cools its free end flexes away from said support and means responsive to the flexing of said free end away from its support to terminate the time interval.

13. In an automatic electric toaster, the combination of a casing, vertical posts at the front and rear ends of the casing, a carriage slidably mounted on the rear end post to move from an upper non-toasting position to a lower toasting position, a bread rack attached to the carriage to move therewith, a lever pivoted on the rear end post and projecting beyond the casing to provide an operating handle, a lever arm which is pivoted on the front end post, extends to the rear of the casing and has a pin and slot connection with the carriage, the slot extending at an angle to the vertical when the carriage is in its upper non-toasting position, a link connecting the lever to said arm, a catch arm which moves with said lever arm, a trip latch with which the catch arm engages when the carriage is moved to toasting position, and timing means for effecting movement of the trip latch to release the carriage for movement to non-toasting position, said timing means comprising a bimetallic element pivoted at one end and having a support for its other end, heating means for said bimetallic element, means for controlling the energization and deenergization of said heating means, said bimetallic element being so arranged that when heated its free end tends to flex toward said support, said support being rigidly mounted so as to resist movement of said free end toward said support so that said bimetallic element bows in a direction away from the support, a switch arm having a hook adapted to engage under the bimetallic element after the latter is bowed and to hold it in bowed condition so that when it cools its free end flexes away from said support, said trip latch being actuated by the flexing of said free end away from its support to disengage said catch arm and thereby release the carriage for movement to non-toasting position, and means actuated by movement of said carriage from toasting to non-toasting position for moving said hook from engagement with the bimetallic element.

References Cited in the file of this patent

UNITED STATES PATENTS

| Number | Name | Date |
|---|---|---|
| 340,037 | Frost | Apr. 13, 1886 |
| 692,039 | Thorpe | Jan. 28, 1902 |
| 2,196,394 | Ireland | Apr. 9, 1940 |
| 2,254,946 | Ireland | Sept. 2, 1941 |
| 2,262,279 | Gomersall et al. | Nov. 11, 1941 |
| 2,288,748 | Scharf | July 7, 1942 |
| 2,302,117 | Gomersall | Nov. 17, 1942 |
| 2,332,518 | Koci | Oct. 26, 1943 |
| 2,389,434 | Huck | Nov. 20, 1945 |
| 2,541,207 | Cole | Sept. 28, 1946 |
| 2,542,231 | Campbell | Feb. 20, 1951 |
| 2,548,680 | Olson et al. | Apr. 10, 1951 |
| 2,555,697 | Lillyblad et al. | June 5, 1951 |
| 2,560,261 | Thomas | July 10, 1951 |
| 2,574,993 | White | Nov. 13, 1951 |